United States Patent [19]

Nishimura

[11] Patent Number: 4,726,617
[45] Date of Patent: Feb. 23, 1988

[54] ADJUSTABLE VEHICLE SEAT MOUNTING
[75] Inventor: Shinichi Nishimura, Zama, Japan
[73] Assignee: Nissan Motor Co., Ltd., Yokohama, Japan
[21] Appl. No.: 21,950
[22] Filed: Mar. 5, 1987
[30] Foreign Application Priority Data Mar. 11, 1986 [JP] Japan .................................. 61-51314

[51] Int. Cl.⁴ ............................................... B60N 1/02
[52] U.S. Cl. .................................... 296/65 R; 297/473
[58] Field of Search ...................... 296/65 R; 297/473; 248/430, 429; 280/801

[56] References Cited

U.S. PATENT DOCUMENTS

| 4,248,480 | 2/1981 | Koucky et al. | 296/65 R |
| 4,262,963 | 4/1981 | Bauer et al. | 297/473 |
| 4,556,186 | 12/1985 | Langmesser, Jr. | 296/65 R |
| 4,673,217 | 6/1987 | Nishimura | 297/473 |

FOREIGN PATENT DOCUMENTS 60-137632 9/1985 Japan .

*Primary Examiner*—Robert R. Song
*Attorney, Agent, or Firm*—Schwartz, Jeffery, Schwaab, Mack, Blumenthal & Evans

[57] ABSTRACT

A lower slide member has an upright side wall formed with a plurality of holes for engagement with an end of a latch member. The latch member is movably installed not only on a pair of depending wall portions of a stay but on a reinforcement member attached to a side wall of an upper slide member such that an impact applied to a buckle of a seat belt fastener in a vehicle collision is transmitted from the upper slide member to which the stay is secured to a vehicle body via the reinforcement member, latch member and lower slide member.

7 Claims, 5 Drawing Figures

ADJUSTABLE VEHICLE SEAT MOUNTING

BACKGROUND OF THE INVENTION

1. Field of the Invention

The present invention relates in general to vehicle seats and more particularly to an adjustable vehicle seat mounting of the kind provided with a stay for supporting a buckle of a seat belt fastener.

2. Description of the Prior Art

A vehicle seat such as a vehicle front seat is mounted on a vehicle body by way of an adjustable seat mounting device so that it can be selectively locked in various adjusted positions relative to a fixed portion of the vehicle. A kind of adjustable seat mounting device is provided with a stay for supporting a buckle of a seat belt fastener. This kind of adjustable seat mounting device is disclosed in Japanese Provisional Utility Model Publication No. 60.137632 and also shown in FIGS. 4 and 5. FIGS. 4 and 5 show a portion of the adjustable seat mounting device disposed on the lower, inboard side of a vehicle seat. The inboard portion of the adjustable seat mounting device includes a stay 10, a lower slide member 12 enlongated in the fore and aft direction of the vehicle body and secured to the vehicle body by way of the stay 10 and an upper slide member 14 slidably mounted on the lower slide member 12 and adapted for mounting thereon a seat cushion. A lock plate 16 is disposed right under the lower slide member 12 and has at the inboard end thereof a number of teeth 18. Secured to an upper, rearward portion of the upper slide member 14 is a stay 20 for supporting a buckle 22 of a seat belt fastener. Secured to a nearly central portion of the stay 20 is a bracket 24 for supporting a release lever 26 which is manually operated when the seat is to be adjusted in position in the fore and aft direction of the vehicle body. Interposed between the release lever 26 and bracket 24 is a return spring 28 for urging the release lever 26 to turn in the direction of the arrow "A". A catch plate 30 is mounted on the release lever 26 for oscilation therewith and has a depending wall portion 30a which is formed with a plurality of holes 32 arranged at the same intervals as the teeth 18 of the lock plate 16 so that the teeth 18 are respectively engageable in the corresponding holes 32 of the catch plate 30.

In the event of a vehicle collision, a force "F" as large as about 100 kg will be applied to the buckle 22 of the seat belt fastener and transmitted therefrom to the vehicle body via the stay 20, bracket 24, release lever 26, catch plate 30, lock plate 16 and lower slide member 12. For this reason, in order that the adjustable seat mounting device can withstand a considerably large impact applied thereto from the seat belt and transmit it to the vehicle body in the event of a vehicle collision, it has been necessary for the stay 20; bracket 24, release lever 26, catch plate 30, lock plate 16 and lower slide member 12 to be enlarged in thickness and diameter, causing an obstacle to the reduction of the vehicle weight.

SUMMARY OF THE INVENTION

In accordance with the present invention, there is provided a novel and improved vehicle seat mounting which comprises a fixed lower slide member having an upright side wall, an upper slide member slidably disposed on the lower slide member for longitudinal movement relative thereto and having a side wall located in opposition to the upright side wall of the lower slide member, a series of holes perforated in the upright side wall of the lower slide member and extending in the longitudinal direction of same, a stay secured to the upper slide member for supporting a buckle of a seat belt fastener and having an extension wall located in opposition to the upright side wall of the lower slide member, an elongated latch member installed on the extension wall of the stay for longitudinal movement toward and away from the upright side wall of the lower slide member but against movement transversal to the longitudinal axis thereof and having an end engageable in the holes, a reinforcement member secured to the side wall of the upper slide member and located in opposition to the upright side wall of the lower slide member, the latch member being installed on the reinforcement member for longitudinal movement toward and away from the upright side wall of the lower slide member but against movement transversal to the longitudinal axis thereof, means for biasing the latch member toward the upright side wall of the lower slide member for thereby engaging the aforementioned end of the latch member in the holes, and manually operated release lever means for moving the latch member toward and away from the upright side wall of the lower slide member against the bias of the biasing means and thereby disengaging the former from the latter.

The above structure is free from the above noted disadvantage inherent in the prior art device.

It is accordingly an object of the present invention to provide a novel and improved vehicle seat mounting which is light in weight and has a sufficient rigidity against impact applied thereto from a seat belt.

It is a further object of the present invention to provide a novel and improved vehicle seat mounting which is desirable not only from the point of view of the vehicle weight reduction but from the point of view of the safety of the vehicle occupant.

DETAILED DESCRIPTION OF THE PREFERRED EMBODIMENT

Figure 1:
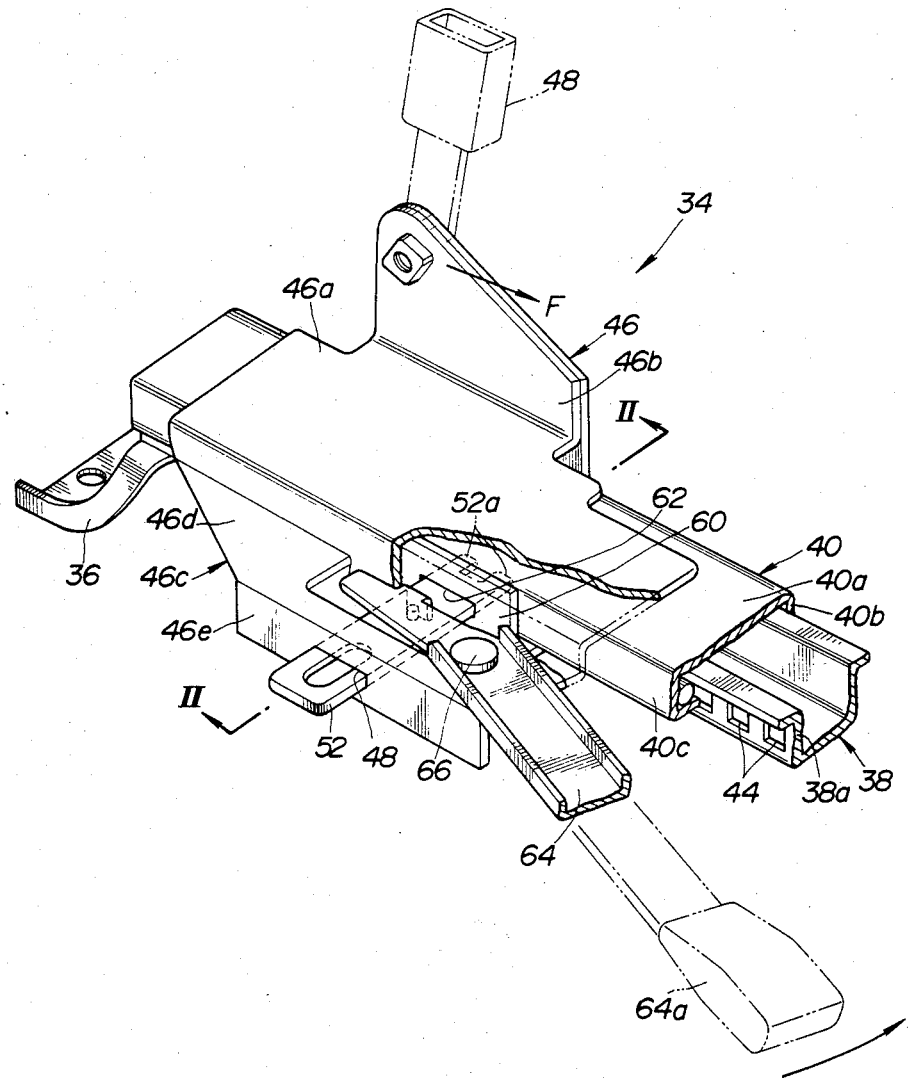
FIG. 1 is a perspective, partly broken away, view of an adjustable vehicle seat mounting device according to the present invention.
Figure 2:
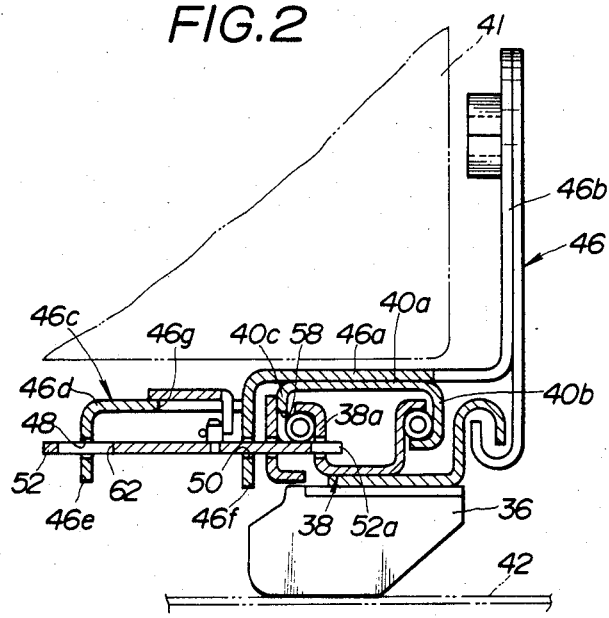
FIG. 2 is a sectional view taken along the line II—II of FIG. 1.
Figure 3:
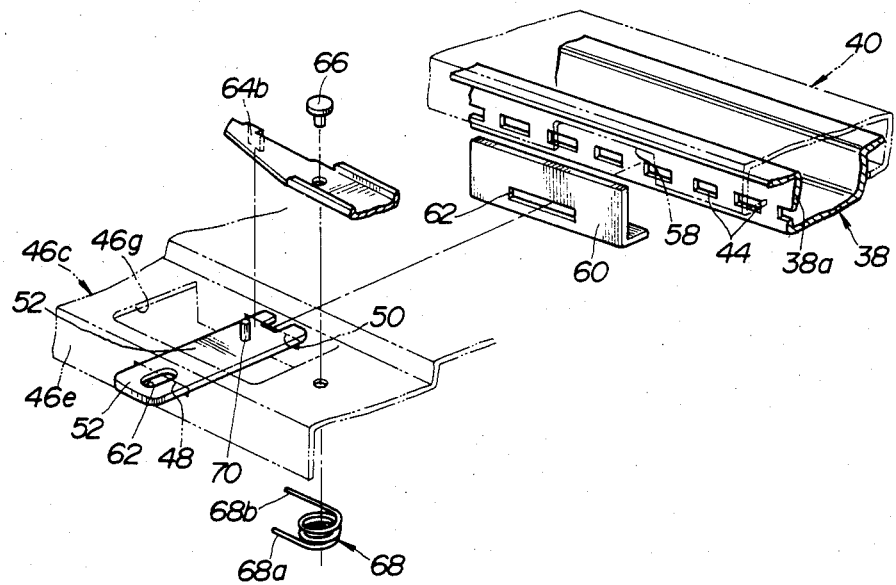
FIG. 3 is an exploded view of an important portion of the adjustable vehicle seat mounting device of FIG. 1.
Figure 4:
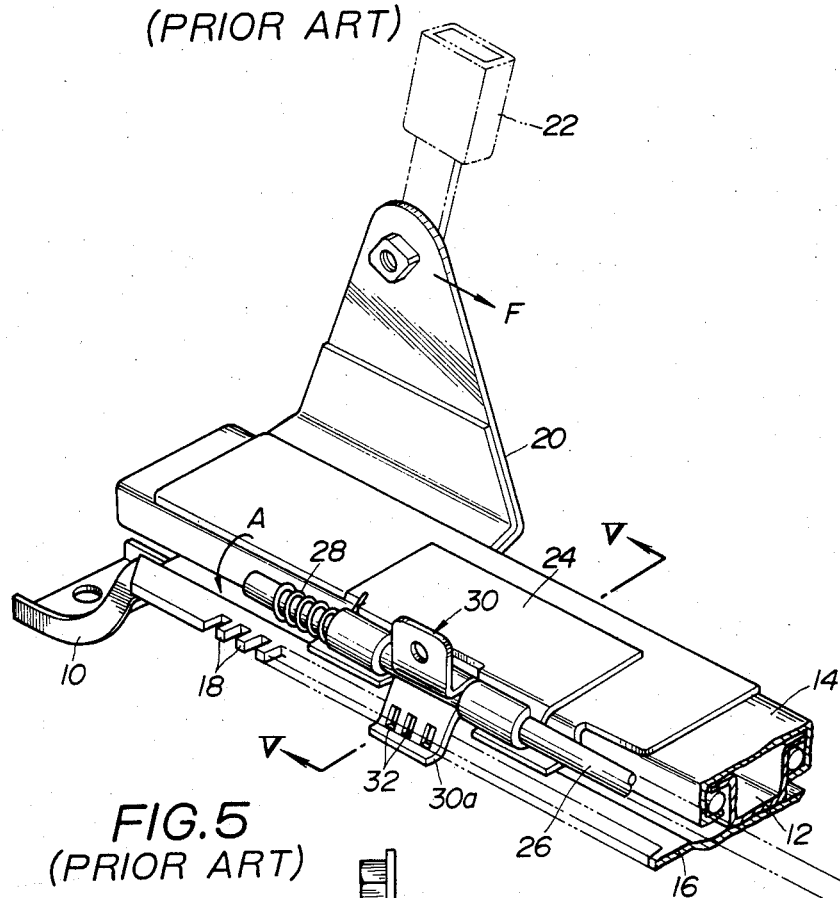
FIG. 4 is a perspective view of a prior art adjustable vehicle seat mounting device.
Figure 5:
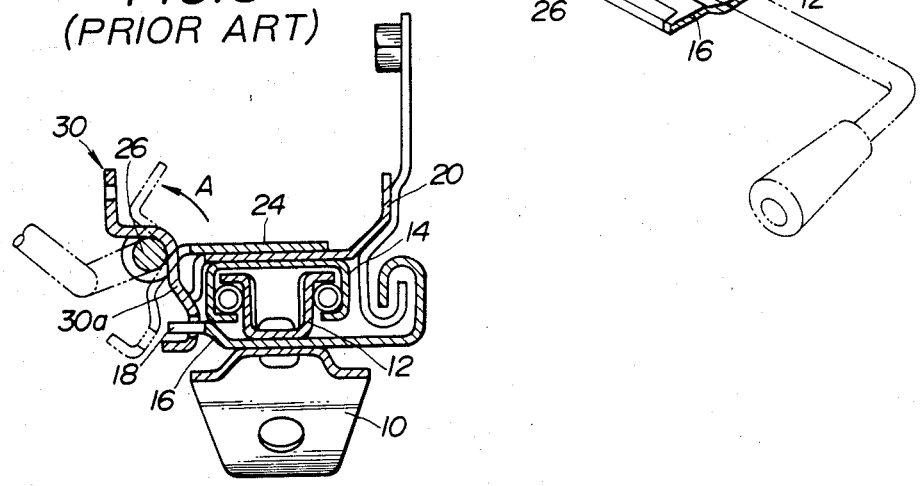
FIG. 5 is a sectional view taken along the line V—V of FIG. 4.

Referring to FIGS. 1 through 3, an adjustable vehicle seat mounting device of the present invention is generally indicated by 34 and shown as including a stay 36, a lower slide member 38 and an upper slide member 40. The lower slide member 38 is elongated in the fore and aft direction of a vehicle body 42 and bolted or otherwise secured by way of the stay 36 to the vehicle body 42. The upper slide member 40 is slidably mounted on the lower slide member 38 in the conventional manner and adapted to mount thereon a seat 41.

The lower slide member 38 is of a U-like cross section and has on the outboard side thereof an upright side wall 38a perforated with a series of holes 44 extending in the longitudinal direction of the lower slide member 38. The upper slide member 40 is of an inverted U-like cross section and has a top wall 40a and a pair of upright side walls 40b, 40c opposing in the lateral direction of the vehicle body 42. A stay 46 for supporting a buckle 48 of a seat belt fastener has an attaching wall 46a overlying the top wall 40a of the upper slide member 40 and welded or otherwise secured thereto. The stay 46 also has an upstanding wall 46b upstanding from the inboard end of the attaching wall 46a and an extension wall 46c extending outboard from the outboard end of same. The upstanding wall 46b is disposed adjacent the inboard end of the seat 41 and adapted to support the buckle 48 of the seat belt fastener. The extension wall 46c is located on the upright side wall 38a side of the lower slide member 38 and has a top wall portion 46d in parallel to the top wall 40a and a pair of depending wall portions 46e, 46f depending from the top wall portion 46c and opposing in the lateral direction of the vehicle body 42. In this connection, one 46e of the depending wall portions is located at a free, outboard end of the top wall portion 46d and in opposition to the upright side wall 38a of the lower slide member 38. The other depending wall portion 46f is located between the depending wall portion 46e of the stay 46 and the upright side wall 38a of the lower slide member 38 but closer to the latter and formed by cutting and bending the top wall portion 46d, i.e. by pressing processing, while forming an opening 46g in the top wall portion 46d between the depending wall portions 46e, 46f. The depending wall portions 46e, 46f are respectively formed with a pair of guide holes 48, 50 which are aligned so as to permit a latch member 52 in the form of an elongated, planar plate to extend therethrough and be movable therein. An end of the latch member 52 is formed with two teeth 52a which space from each other the same pitch as that of the holes 44 in the direction in which the series of holes 44 extend. The outboard upright wall 40c of the upper slide member 40 is formed with a notch 58 for permitting the toothed end of the latch member 52 to pass therethrough. A reinforcement member 60 in the form of a plate of an L-like cross section is welded or otherwise secured to the outboard upright wall 40c of the upper slide member 40 in such a manner as to cover the notch 58. The reinforcement member 60 is formed with a guide hole 62 aligned with the guide holes 48, 50 so as to permit the latch member 52 to extend therethrough and be movable therein. The latch member 52 is long enough to project outboard from the depending wall 46e even when it is positioned so as to permit the teeth 52a to engage in the corresponding holes 44 of the lower slide member 38. The outboard end of the latch member 52 is formed with a hole 62 at which it may be connected to an outboard portion of the adjustable seat mounting deviced so as to effect a latching action in relation therewith though not shown in the drawing.

A release lever 64 is mounted on the top wall portion 46d of the extension wall 46c on the upper side thereof in such a manner as to be turnable or swingable about a pivot pin 66 attached to the top wall portion 46d. A coiled return spring 68 is mounted on the pivot pin 66 at a portion thereof projecting downward from the lower side of the top wall portion 46d and has an end 68a engaging the depending wall portion 46e of the stay 46 and the other end 68b engaging a pin 70 studded to the upper side of the latch member 52 so that the latch member 52 is urged by the return spring 68 toward the upright side wall 38a of the lower slide member 38. The release lever 64 has a manually operated knob portion 64a and a depending finger 64b which are located oppositely relative to the pivot pin 66. The finger 64b of the release lever 64 projects through the opening 46g of the top wall portion 46d into the space on the lower side of the top wall portion 46d and is adapted to engage the pin 70 so that turning of the release lever 64 against the bias of the return spring 68, i.e., turning of the release lever 64 in the anticlockwise direction in FIG. 1 causes the latch member 52 to move in the left-hand direction in FIG. 2, thus permitting the teeth 52a to disengage from the holes 44 of the lower slide member 38. When the manual effort on the release lever 64 disppears, the release lever 64 is permitted to turn in the clockwise direction in FIG. 1 under the bias of the return spring 68, causing the latch member 52 to move in the right-hand direction in FIG. 2 and engage the upright wall 48a of the lower slide member 38.

The adjustable vehicle seat mounting device thus far described according to the present invention operates as follows. When it is desired to adjust the position of the seat 41 in the fore and aft direction of the vehicle body 42, the release lever 64 is first manually turned in the anticlockwise direction "B" in FIG. 1. By this manual operation, the latch member 52 is caused to move in the left-hand direction in FIG. 2 against the bias of the return spring 68, thus disengaging the teeth 52a of the latch member from the holes 44 of the lower slide member 38 and allowing the upper slide member 40 to be freely movable on the lower slide member 38. After the seat 41 is adjusted to a desired position, the manual effort on the release lever 64 is stopped for thereby permitting the release lever 64 to move in the right-hand direction in FIG. 2 under the bias of the return spring 48, i.e., to return to the illustrated position. By this, the teeth 52a of the latch member 52 are engaged in the holes 44 of the lower slide member 38, thus putting the upper and lower slide members 40, 38 into a latched relation to each other.

In the event of a vehicle collision, a large impact will be applied to the buckle 48 of the seat belt fastener. The impact is then immediately transmitted to the lower slide member 38 via the upper slide member 40 to which the buckle 48 is secured and through the reinforcement member 60 and the latch member 52.

From the foregoing, it is to be understood that the adjustable vehicle seat mounting device of this invention is so constructed and arranged as to dispense with the lock plate which is heavy and indispensable in the prior art device, thus making it possible to contribute to the reduction of the vehicle weight.

It is further to be understood that the stay for supporting the buckle of the seat belt fastener can be less in rigidity as compared with that of the prior art device since it is required to transmit the impact to the upper slide member only. This is also effective for the reduction of the vehicle weight.

What is claimed is:

1. A vehicle seat mounting comprising:
   a fixed lower slide member having an upright side wall;
   an upper slide member slidably disposed on said lower slide member for longitudinal movement relative thereto and having a side wall located in opposition to said upright side wall of said lower slide member;
   a series of holes perforated in said upright side wall of said lower slide member and extending in the longitudinal direction of same;

a stay secured to said upper slide member for supporting a buckle of a seat belt fastener and having an extension wall located in opposition to said upright side wall of said lower slide member;

an elongated latch member installed on said extension wall of said stay for longitudinal movement toward and away from said upright side wall of said lower slide member but against movement transversal to the longitudinal axis thereof and having an end engageable in said holes;

a reinforcement member secured to said side wall of said upper slide member and located in opposition to said upright side wall of said lower slide member;

said latch member being installed on said reinforcement member for longitudinal movement toward and away from said upright side wall of said lower slide member but against movement transversal to the longitudinal axis thereof;

means for biasing said latch member toward said upright side wall of said lower slide member for thereby engaging said end of said latch member in said holes; and manually operated release lever means for moving said latch member away from said upright side wall of said lower slide member against the bias of said biasing means and thereby disengaging the former from the latter.

2. A vehicle seat mounting as set forth in claim 1 wherein said upper slide member is of an inverted U-like cross section and further has a top wall and a side wall opposing to said first mentioned side wall of said upper slide member in the lateral direction of the vehicle, said stay further having an attaching wall overlying said top wall of said upper slide member and secured thereto and an upstanding wall upstanding from an inboard end of said attaching wall and adapted for support of the buckle of the seat belt fastener, said extension wall of said stay extending outboard from an outboard end of said attaching wall and having a top wall portion and a pair of depending wall portions depending from said top wall portion and located in opposition to each other, through which depending wall portions said latch member extends.

3. A vehicle seat mounting as set forth in claim 2 wherein said latch member is in the form of an elongaged, planar plate and said end of said latch member is toothed for engagement with a plural number of said holes at the same time.

4. A vehicle seat mounting as set forth in claim 3 wherein said reinforcement member is in the form of a plate of an L-like cross section and formed with a guide hole in which a portion of said latch member adjacent said end of same is movably disposed.

5. A vehicle seat mounting as set forth in claim 4 wherein one of said depending wall portions is located at a free, outboard end of said top wall portion and in opposition to said upright side wall of said lower slide member, the other depending wall portion being located between said one depending wall portion and said upright side wall of said lower slide member, said depending wall portions being respectively formed with guide holes in which said latch member is movably disposed, said reinforcement member being located between said other depending wall portion and said upright side wall of said lower slide member.

6. A vehicle seat mounting as set forth in claim 5 wherein said top wall portion of said extension wall of said stay is substantially parallel to said top wall of said upper slide member and formed with an opening between said depending wall portions, said release lever means having a release lever pivotally mounted on the upper side of said top wall portion of said extension wall and a latch pin attached to the upper side of said latch member, said release lever having a depending finger projecting through said opening of said top wall portion into the space on the lower side of said top wall portion and adapted for engagement with said latch pin such that turning of said release lever in a predetermined direction causes said latch member to move away from said upright wall of said lower slide member against the bias of said biasing means.

7. A vehicle seat mounting as set forth in claim 6 wherein said release lever means further comprises a pivot pin attached to said top wall portion of said extension wall of said stay, said release lever having a manually operated knob portion and being pivotally mounted on said pivot pin in such a manner that said depending finger and said control knob are located oppositely relative to said pivot pin, said pivot pin having a portion projecting into the space on the lower side of said top wall portion of said extension wall, said biasing means comprising a coil spring mounted on said portion of said pivot pin and having an end engaged with said one depending wall portion of said extension wall and the other end engaged with said latch pin.

* * * * *